United States Patent Office 2,847,475
Patented Aug. 12, 1958

2,847,475

COPPER-CONTAINING CATALYSTS AND PROCESS OF PRODUCING ALDEHYDES

Hervey H. Voge, Berkeley, and Leland T. Atkins, Orinda, Calif., assignors to Shell Development Company, New York, N. Y., a corporation of Delaware No Drawing. Application June 6, 1955
Serial No. 513,597

8 Claims. (Cl. 260—604)

This invention relates to supported copper-containing catalysts. The invention relates more particularly to novel catalyst compositions consisting essentially of a solid support and an adherent pellicular deposit of copper, to the method of their production and to their use in the execution of chemical reactions.

Supported copper catalysts available heretofore are generally obtained by methods comprising one or more such steps as, for example, mixing the solid support with a slurry containing metallic copper followed by a drying of the mixture, the impregnation of a solid support with a copper compound followed by thermal decomposition of the deposited compound, hydrogenation of oxides of copper deposited upon a support, and the like. Usually, in such methods, no control is had over the thickness and uniformity of the copper deposit formed. Often they rely upon the use of relatively large amounts of copper, thereby increasing catalyst cost. As a consequence of the method of production, these catalysts generally are lacking in uniformity and durability. The copper does not adhere firmly to the support; and the compositions tend to lose relatively rapidly their ability to function efficiently as catalysts. Their lack of uniformity and of durability of structure often results in variations in catalyst behavior during use, thereby necessitating costly and time-consuming readjustments of operating conditions. Absence of firm adherence of copper to the support and resulting high rate of catalyst entrainment during use contribute to operational difficulties and product contamination.

It is an object of the present invention to provide an improved supported copper-containing catalyst, obviating to at least a substantial degree the foregoing difficulties of the prior art, as well as a method enabling its efficient production with a minimum of operative steps.

Another object of the invention is to provide an improved copper catalyst which contains comparatively small, but nevertheless, adequate amounts of copper in the form of a uniform pellicular deposit upon the surface of a solid support, and which is characterized by unusually firm adherence of the pellicular copper coating to the surface of the support.

Another object of the invention is to provide an improved copper-containing catalyst consisting essentially of a uniform deposit of copper in the form of cuprous oxide upon the surface of a solid support.

Still another object of the invention is the provision of an improved supported copper catalyst capable of retaining its high activity over long periods of use, e. g., for several hundred hours of operation at elevated temperature.

A further object of the invention is an improved process enabling the more efficient execution of chemical reactions catalyzed by copper-containing catalysts.

A still further object of the invention is the provision of an improved process enabling the more efficient oxidation of hydrocarbons with the aid of novel supported copper-containing catalysts.

A specific object of the invention is the provision of an improved process enabling the more efficient controlled, incomplete oxidation of normally gaseous hydrocarbons comprising propylene to carbonylic reaction products comprising acrolein. Other objects and advantages of the present invention will become apparent from the following detailed description thereof.

It has now been found that substantially improved copper-containing supported catalysts are obtained by chemically reducing an alkaline suspension, or solution, of a copper compound in the presence of a solid support material under conditions effecting the deposition of a uniform, adherent, pellicular deposit of active metallic copper upon the surface of the support material.

In its broad aspect, the invention resides in novel catalysts and in a process for their production. The process by which the novel catalysts are produced in accordance with the invention comprises the deposition of a firmly adhering, pellicular metallic copper deposit upon a suitable carrier or solid support material by treating the carrier or support material, successively, and preferably in the order named, with a solution or suspension of a reducible copper compound, a base and a reducing agent. Upon bringing the carrier or support material into contact with each of these reagents, preferably at slightly elevated temperature conditions for a suitable period of time, a thin film of copper, usually in the form of a copper mirror, is deposited upon the support. Subjection of the novel catalysts to suitable oxidizing conditions converts the copper deposit to a firmly adhering, uniformly distributed deposit of cuprous oxide.

In accordance with the invention, novel supported copper-containing catalysts are obtained by a process comprising the following sequence of steps: adding a solution of a copper salt such as, for example, aqueous copper acetate to a suitable solid support material which has preferably been preheated to a moderately elevated temperature, adding an ammonium hydroxide solution or gaseous ammonia to the resulting mixture in sufficient amount to re-dissolve any precipitate formed, and thereupon adding to the resulting mixture a reducing agent such as, for example, hydrazine or hydrazine hydrate. During the preparation of the catalyst the mixture is maintained at a temperature in the range of, for example, from about 10 to about 150° C. and preferably from about 40 to about 100° C. Upon completion of the addition of reducing agent, the mixture is maintained at a temperature within the prescribed temperature range for a period of time sufficiently long to result in the deposition of a desired amount of copper upon the support. During the preparation of the catalyst the mixture is preferably stirred or otherwise agitated by suitable conventional means. The amount of copper salt employed in producing the catalyst is controlled to provide the desired amount of copper in the finished catalyst. The reducing agent is added in an amount substantially equal to, or in excess of, the stoichiometrical equivalent of the copper salt employed in the preparation of the catalyst. Its addition is preferably controlled to reduce sufficient copper compound to provide the requisite amount of copper in the finished catalyst. The ammonium hydroxide solution or gaseous ammonia is preferably added to the copper compound-containing solution in an amount just sufficient to re-dissolve any precipitate formed.

Preparation of the catalyst in accordance with the invention may be modified to the extent of adding the solution of ammonium hydroxide or gaseous ammonia to the copper salt-containing solution and thereafter adding the mixture to the solid support material which may have been preheated, then adding the reducing agent.

In a further modification of the method of preparing the catalysts in accordance with the invention, the solution of ammonium hydroxide or gaseous ammonia may be added to the copper salt-containing solution, and the resulting ammoniacal copper salt-containing solution then added to the reducing agent in the absence of the support material. The support material, which has preferably been preheated to a moderately elevated temperature, is then added and the total mixture maintained at a temperature within the prescribed temperature range for a period of time. In the latter modification wherein all reagents are admixed before being added to the support material, it is essential that the support be added to the total mixture with a minimum lapse of time after addition of the reducing agent to the ammoniacal copper salt solution, for it is essential to the obtaining of the very objects of the invention that reduction of the copper compound to metallic copper takes place on the surface of the solid support material and not to any substantial degree in the solution. It has been found that the desired formation of the copper metal upon the surface of the support without formation of any substantial amounts of metallic copper in the solution proper is aided by the preheating of the support material to a moderately elevated temperature before combining the copper compound-containing solution therewith. Temperatures to which the supports are preheated generally do not substantially exceed about 150° C. and usually lie in the range of from about 40° to about 100° C. The temperature within the defined range to which the support is preferably preheated will vary in accordance with the temperature of catalyst preparation employed. In the preferred method of catalyst preparation, the support is preheated to a temperature at least equal to the minimum temperature at which reduction of the copper compound is to be carried out.

Under the above-defined conditions of catalyst preparation, reduction of the copper compound in the ammoniacal copper salt solution will take place with the deposition of a thin film of firmly adhering metallic copper upon the support, usualy in the form of a copper mirror.

Although the copper salts of carboxylic acids such as, for example, copper acetate, constitute a preferred group of reducible copper compounds used as a starting material in the preparation of the novel catalysts, the invention is in nowise limited thereto, and any reducible copper compound, emanating from any suitable source capable of reduction to metallic copper in alkaline solution in the presence of the support material, may be employed within the scope of the invention. Other examples of the broad class of reducible copper compounds comprise: cupric hydroxide, cupric chloride, cupric nitrate, cupric-ammonia complex, etc.

In the preferred method of preparing the novel catalysts in accordance with the invention, hydrazine, or hydrazine hydrate, is used as reducing agent. Hydrazine is unique in its function as reducing agent in the process of the invention in that it enables the production of compositions the characteristics and properties of which differ markedly from materials prepared with different reducing agents but under otherwise substantially identical conditions. The compositions produced therewith are superior with respect to adherence of the pellicular copper to the support, uniformity of copper distribution over the surface of the support, and catalytic activity. The superior quality of these compositions may be attributed, at least in part, to the fact that this reducing agent itself does not comprise components capable of functioning as residual organic or other byproducts which, by occlusion in the surface of the support, tend to interfere with the mechanism by which optimum degree of adherence of the pellicular copper to the surface of the support is obtained. Although hydrazine and hydrazine hydrate are thus not the equivalent of other available reducing agents, the invention is in nowise limited to the use of these preferred materials, and other reducing agents capable of reducing the reducible copper compound in the alkaline solution to metallic copper in the presence of the support under the conditions forming the film of metallic copper upon the support may be used within the scope of the invention. Additional examples of the broad class of reducing agents which may be employed in accordance with the invention are: hydrazine salts such as hydrazine sulfate, phenyl hydrazine, reducing sugars, glucose, sodium potassium tartrate, hydroxylamine, aliphatic aldehydes such as formaldehyde, certain ketones, etc.

The specific reducing agent preferably employed is governed to some degree by the specific copper compound to be reduced in the alkaline copper solution. Thus, by way of example, the preparation of the catalyst in accordance with the invention may involve: the use of hydrazine sulfate to reduce the copper compound present in the solution obtained by dissolving cupric hydroxide in aqueous ammonia; the use of phenyl hydrazine to reduce the copper compound present in a solution of cupric hydroxide in aqueous ammonia; the use of hydrazine sulfate to reduce the copper compound present in a cupric sulfate solution, etc. The reducing agent may comprise a plurality of components. Thus, a reducing solution containing Rochelle salts, sucrose and formaldehyde may suitably be employed to reduce a cupric chloride solution in the presence of the support.

Any member of the broad class of inert, refractory solid support materials may be employed in producing the catalysts of the invention. Such supports comprise, for example, diatomaceous earth, fullers earth, selected clays and the like. It is generally preferred to use materials of a larger particle size, such as pumice, calcined granular diatomaceous earth, granules of silica, silicon, silicon carbide, boron carbide, Carborundum, alumina, carbon, magnesia, thoria, bauxite, sandstone, crushed firebrick, majolica, glass beads, fused zirconia, silica-alumina mixtures, silica gel, and metal oxide gel materials comprising oxides of chromium, molybdenum, tungsten and the like, mixtures of one or more of the foregoing, etc. Porous aggregates may be prepared by bonding together granules of one or several of the above materials. Aggregates comprising from 75% to 100% of alumina and up to 25% silica, bonded together by partially fusing or with the aid of a ceramic bonding clay or other bonding material provide satisfactory support materials.

Preferred support materials for the pellicular copper-containing catalysts of the present invention are those having a relatively low surface area. Particularly preferred are those comprising relatively smooth and relatively non-porous surface areas. Examples of preferred support materials include: silicon, silicon carbide, glass beads; ceramically bonded alumina and silica composites such as those known by the trade names, Alfrax, Aloxite, and Alundum; diatomites pelleted with the aid of a small amount of clay binder such as those known as Celites; alpha alumina, haydite, zirconium carbide, zirconium boride, boron nitride; and the like.

The supports to be employed in preparing the catalysts of the invention may be subjected to suitable pretreatments. Such pretreatment may comprise, for example, one or more such steps as: subjection to elevated temperatures, optionally in an atmosphere of steam, inert gas, etc.; treatment with one or more mineral acids including hydrogen chloride, nitric acid, hydrogen fluoride; subjection to contact with a halogen such as iodine, chlorine, fluorine, etc. The pretreatment may comprise the deposition of minor amounts of a metal, such as silver, gold, platinum, and the like, upon the support.

The catalysts prepared as defined above are freed of excess liquid, for example, by decantation, filtration, or the like, after deposition of the metallic copper upon the surface of the support. The catalyst is thereupon preferably washed with a suitable solvent. Water is generally a satisfactory solvent.

The washed catalyst is preferably dried. The drying may be carried out in air and, optionally, in an atmosphere of hydrocarbon and/or inert gas. The drying is preferably carried out at an elevated temperature, for example, in the range of from about 100 to about 250° C.

The novel method of preparing supported copper catalysts enables the direct obtaining of a supported copper catalyst comprising the copper not only in the form of active metallic copper but in the form of a strongly adhering skin-like, or pellicular, deposit upon the support as well. The rate at which copper is deposited upon the surface of the support and the total amount of copper comprised in the finished catalyst will vary directly with increase in temperature during the time of contact of the support with the reagents after addition of the reducing agent. Degree of adherence of the copper deposit to the surface of the support generally varies indirectly with rate of copper deposition. In general, the amount of copper so deposited is relatively small, that is, for example, about 0.2 gram to 10 grams per 100 cc. of catalyst. Greater or lesser amounts of copper may, however, be contained in the novel catalysts within the scope of the invention. Although the copper content of the catalysts of the invention is generally relatively small, the surface area of the metallic copper, because of the pellicular characteristic of the deposit, is exceedingly large as compared with the total weight of metallic copper present.

An advantage inherent in the catalysts prepared in accordance with the invention resides in their ability to function as catalysts at a high level of activity without further subjection to activating treatment before use. However, the finished catalyst may, if desired, be subjected to one or more such steps as, for example, contact with a mineral acid and/or a metal salt solution; contact with a halogen such as chlorine, iodine, fluorine, etc., and/or mercury and/or metalloids such as arsenic, antimony, etc.; subjection to elevated temperatures in an atmosphere of inert gas, oxygen-containing gas and/or a hydrocarbon, within the scope of the invention.

The following examples are illustrative of the preparation of catalysts comprised within the scope of the invention:

Example I

A supported copper catalyst, identified by the designation "A" was prepared as follows: 300 cc. of glass beads having a diameter of 3 mm. were pretreated by successive washing in dilute hydrochloric and nitric acids. The acid-treated beads were washed in water and dried. An ammoniacal, copper-containing solution was made by dissolving 15 g. of cupric acetate $(Cu(OAc)_2 \cdot H_2O)$ in 500 cc. of water, and then adding strong aqueous ammonia solution until the precipitate first formed was just dissolved. A reducing solution consisting of 42% hydrazine hydrate in water was prepared. A coating solution was prepared by mixing 400 cc. of the ammoniacal copper-containing solution with 40 cc. of the reducing solution. The coating solution thus prepared was poured over the washed, acid-treated beads which had been preheated to a temperature of 90° C. The temperature of the resulting mixture, which was found to be 35° C. immediately after the mixing, was raised to 43° C. over a period of 10 minutes, and was held at 43° C. for an additional 10 minutes with frequent stirring. Liquid was then drained from the beads and they were washed with water and dried. The product had a copper content of 0.026% by weight in the form of a pellicular firmly adhering coating of metallic copper (mirror) uniformly covering the surface of the beads.

Example II

A supported copper-containing catalyst, identified by the designation "B," was prepared as follows: An ammoniacal copper-containing solution was prepared by adding just enough aqueous ammonia to an aqueous solution of cupric acetate containing 30 g. of cupric acetate per liter to re-dissolve the precipitate formed. To 800 cc. of the ammoniacal copper-containing solution there was added 80 cc. of 42% aqueous hydrazine hydrate solution. The mixture was then poured onto 200 cc. of acid-washed 8–14 mesh alumina (Alorco Tabular Alumina granules, Type T–71). The alumina was heated to 90° C. before addition of the mixed aqueous solutions. The resulting mixture was heated on a water bath at 40–42° C. for a period of about one hour, with frequent stirring. Excess liquid was decanted from the mixture and the copper-coated alumina was then water washed and dried. The dried catalyst contained 1.88% by weight of metallic copper. Examination of the catalyst under a microscope showed it to possess a uniform, film-like coating of shiny metallic copper (copper mirror) over the surface of the support material. When a portion of the copper-coated granules was heated in air at 400° C., the copper was converted to a uniform black coating of copper oxide consisting predominantly of cupric oxide. Reduction at 150–200° C. regenerated the metallic copper and there was no visible evidence of aggregation of the copper; the regenerated granules had the appearance of the original pellicular copper-coated particles.

Example III

For the purpose of comparison, a supported copper-containing catalyst identified by the designation "C" was prepared by the prior art "impregnation-reduction" method as follows: Granules of acid-washed alumina such as used in Example II (Alorco T–71 Tabular alumina) were boiled for ten minutes in a solution of 10 g. $Cu(NO_3)_2 \cdot 3H_2O$ in 48 cc. of water. The excess solution was drained off and the granules were blotted between filter papers, dried, and calcined two hours at 450° C. The final catalyst contained 1.6% copper. The impregnation was not uniform. Microscopic examination showed the copper in the catalyst to consist, not of a uniform pellicular deposit, but of small crystals of cupric oxide scattered over the alumina surface, most of which surface was completely bare. The copper crystals did not adhere well and tended to brush off easily. Reduction by heating in an atmosphere of propylene converted the cupric oxide crystals to small chunks of metallic copper, which were still scattered about on the alumina surface.

Example IV

A supported copper-containing catalyst, identified by the designation "D," was prepared in accordance with the invention substantially as described in the foregoing Example II with the exception that silicon carbide particles were substituted for the alumina. The catalyst obtained consisted of granular silicon carbide containing 2% by weight of copper in the form of a uniformly distributed coating of pellicular metallic copper upon the surface of the particles.

Example V

A supported copper-containing catalyst, identified by the designation "E," was prepared by contacting alpha alumnia particles with 0.1 n silver nitrate solution and washing the so-treated support with water. The pretreated alumina was immersed in 1000 cc. of double strength Fehling solution, and 50 cc. of 37% aqueous formaldehyde was added. The resulting mixture was maintained at room temperature for about one hour. Thereafter, excess liquid was decanted from the mixture and the catalyst was washed and dried in air. The resulting catalyst was contacted with acetic acid, washed with water and dried in air. The finished catalyst contained 1.8% of copper in the form of a uniformly distributed firmly adhering deposit of pellicular metallic copper.

A particular advantage inherent in the catalysts of the present invention resides in the ease with which they are converted to the cuprous oxide state. Without intent to limit in any wise the scope of the invention by theory advanced herein to set forth more fully the nature of the invention, it is believed that the ease with which the copper is converted to the cuprous oxide state is directly attributable to the nature of the copper deposit consisting essentially of a pellicular or mirror-like surface. By simply heating the catalyst at a temperature of, for example, above about 100° C., but not substantially above about 250° C. in an oxidizing atmosphere consisting essentially of air, oxygen, or an oxygen-containing gas for a sufficient length of time, the copper deposit is converted to the oxide form consisting essentially of cuprous oxide in which form it functions as catalyst for the incomplete oxidation of unsaturated hydrocarbons. It may also be brought to the cuprous oxide state by heating in an atmosphere comprising a hydrocarbon and an oxygen-containing gas, for example, by heating in a mixture comprising oxygen and a normally gaseous hydrocarbon in the range of from about 100 to about 600° C. The resulting calalyst comprises the cuprous oxide in the form of a uniformly distributed, firmly adhering deposit upon the surface of the support.

*Example VI*

A copper-containing catalyst, identified by the designation "F," comprising substantially all of the copper in the form of cuprous oxide, was prepared by heating a portion of the catalyst "B," produced as described in the foregoing Example II, in air at a temperature in the range of from about 120 to about 150° C. for 3 hours. Another copper-containing catalyst, identified by the designation "G," comprising substantially all of the copper in the form of cuprous oxide, was prepared by heating a separate portion of the catalyst "B" at 300° C. for one hour in an atmosphere consisting essentially of propylene and oxygen in a volume ratio of propylene to oxygen of 10:1. Catalysts "F" and "G," thus prepared, consisted essentially of a uniformly distributed, firmly adhering deposit of cuprous oxide upon alumina. The oxide deposit was identified as cuprous oxide by its characteristic cuprous oxide coloring, by observation of the oxygen consumed during their production, by measurement of hydrogen required for reduction to copper, and by magnetic analysis.

The catalysts of the invention are applied broadly to the execution of organic reactions catalyzed by copper in the metallic and cuprous oxide form. Such reactions comprise, for example: oxidation of hydrocarbons to acids, alcohols, aldehydes, ketones, etc.; oxidation of olefinic hydrocarbons to unsaturated carbonylic compounds, unsaturated carbionls, etc.; oxidation of aromatic hydrocarbons to acids, aldehydes, phenolic compounds, etc.; dehydrogenation, hydrogenation, chlorinaton, dechlorination, hydrochlorination and dehydrochlorination, etc.

The catalysts of the present invention are applied with particular advantage to the production of unsaturated carbonylic compounds from the corresponding unsaturated hydrocarbons when employed under the conditions of incomplete unsaturated hydrocarbon oxidation as set forth in U. S. Patent 2,451,485. Thus, the passage of an olefinic hydrocarbon in admixture with oxygen, or an oxygen-containing gas, over the catalysts of the present invention under conditions of controlled incomplete oxidation in the temperature range of from about 150 to about 600° C. and a pressure in the range of from about 1 to about 15 atmospheres, as described in said patent, results in the conversion of said olefinic hydrocarbons to oxidation products comprising alpha, beta-unsaturated aldehydes and ketones corresponding to said unsaturated olefins. Under these conditions of controlled incomplete oxidation with the aid of the present catalysts, propylene and isobutylene, for example, are oxidized to reaction products comprising alpha, beta-unsaturated carbonylic compounds consisting essentially of acrolein and methacrolein, respectively. The use of the catalysts of the present invention enables the desired incomplete oxidation to proceed with substantially improved efficiency as evidenced by yield of the desired unsaturated carbonyl products and the ease with which optimum conditions of operation are maintained over long periods of continuous operation.

A further application of the catalysts of the invention resides in the production of reaction products comprising beta, gamma-carbinols from the corresponding unsaturated hydrocarbons under the conditions of incomplete unsaturated hydrocarbon oxidation as set forth in copending applications Serial No. 471,924, filed November 29, 1954, and Serial No. 478,887, filed December 30, 1954. Thus, the subjection of propylene in admixture with an oxygen-containing gas to conditions of controlled incomplete oxidation at a temperature in the range of from about 200 to about 600° C. and at a high pressure in excess of about 500 p. s. i. g. results in the conversion of said propylene to unsaturated reaction products comprising substantial amounts of allyl alcohol.

In carrying out the incomplete unsaturated hydrocarbon oxidation with the catalysts of the present invention, the catalysts may, if desired, be subjected to a pretreatment directed to converting their copper content to the cuprous oxide state. However, as a consequence of the ability of the catalysts of the present invention to assume with unusual rapidity a steady cuprous oxide state, the catalyst may be charged as such to the reaction zone of the incomplete oxidation process and the incomplete oxidation reaction initiated with only a relatively short initial induction period before the catalyst has assumed the cuprous oxide state.

*Example VII*

Propylene was oxidized to acrolein by passing propylene in admixture with oxygen in a mole ratio of propylene to oxygen of about 10:1 over a portion of the catalyst "A," prepared as described in the foregoing Example I, at conditions of incomplete propylene oxidation of about 250 to 300° C., atmospheric pressure and a feed rate of 40 cc. of gas, calculated at 0° C. and 760 mm., per gram of catalyst per minute. The operation was repeated under substantially identical conditions but with the exception that catalyst "B," prepared as described in the foregoing Example II, was used as the catalyst. The catalysts were pretreated before use by being heated for 30 minutes at reaction temperature in the presence of propylene, and were exposed to the propylene-oxygen mixture for about one hour before samples of products were taken. A yield of carbonylic products, consisting largely of acrolein, of 85% was obtained with the use of the catalyst "A," and 86.3% with catalyst "B," observed at equal conversions of oxygen.

*Example VIII*

In three separate operations, acrolein was produced by passing propylene in admixture with oxygen, in a mole ratio of propylene to oxygen of about 8:1, over a copper containing catalyst at controlled conditions of incomplete oxidation at a temperature of about 400° C., a pressure of about 85 pounds and a contact time of about 2 seconds. Water vapor was added to the charge.

In two of the operations, the catalysts "D" and "E," prepared as described in the foregoing Examples IV and V, respectively, were employed. In the third operation, a catalyst, identified by the designation "H," prepared by a method comprising impregnation and calcining steps was used for comparison. Catalyst "H" was prepared as follows: Silicon carbide particles were impregnated with an aqueous solution of cupric nitrate. The impregnated silicon carbide was freed of excess liquid by decantation, dried and calcined at 400° C. The product contained 3.4% of copper (calculated as metallic copper) in the form of cupric oxide. The cupric oxide was reduced to metallic copper by heating at about 400° C., in a reducing atmosphere. Catalysts "D," "E" and "H" were pretreated before use by heating at an elevated temperature in an atmosphere comprising propylene and oxygen. In the operations employing the catalysts "D" and "E," prepared in accordance with the invention, yields of acrolein of 74% and 73%, respectively, based on propylene converted, were obtained with an oxygen conversion of 88% and 89%, respectively. In the operation employing catalyst "H," a yield of acrolein of 66% based on propylene converted was obtained with an oxygen conversion of 90%.

*Example IX*

Propylene was subjected to the controlled conditions of incomplete oxidation substantially as described in foregoing Example VII with the exception that catalysts "F" and "G," prepared as described in the foregoing Example VI, were used. Yields of carbonylic products, consisting predominantly of acrolein, exceeding 85% were obtained.

We claim as our invention:

1. A catalyst composition consisting essentially of particles of solid support material and an adherent pellicular deposit of copper metal formed upon said particles by the action of a reducing agent comprising hydrazine upon an ammoniacal solution of a reducible copper salt in the presence of said solid support material.

2. The catalyst composition in accordance with claim 1 wherein said copper salt is copper acetate.

3. The catalyst composition in accordance with claim 1 wherein said solid support material is silicon carbide.

4. A catalyst composition in accordance with claim 1 wherein said solid composition consists of alumina.

5. An improved copper-containing catalyst composition particularly effective in catalyzing incomplete hydrocarbon-oxidation reactions consisting essentially of a solid support and an adherent uniformly distributed deposit of oxidized pellicular copper obtained by heating in an oxygen-containing atmosphere a support having an adherent pellicular coating of copper formed upon the surface of said support by the reaction of a reducing agent comprising hydrazine upon an ammoniacal solution of a reducible copper compound in the presence of said support.

6. The process for converting olefinic hydrocarbons containing from three to four carbon atoms to the molecule to the corresponding unsaturated carbonylic compounds comprising alpha,beta-acrolein and methacrolein, respectively, which comprises contacting said olefinic hydrocarbons under conditions of controlled incomplete hydrocarbon oxidation in the temperature range of from about 150 to about 600° C. with a copper-containing catalyst composition consisting essentially of a solid support and an adherent uniformly distributed deposit of oxidized pellicular copper obtained by heating in an oxygen-containing atmosphere particles of solid support material comprising an adherent pellicular deposit of copper metal formed on the surface of said particles by the action of a reducing agent comprising hydrazine upon an ammoniacal solution of a reducible copper compound in the presence of said solid support material.

7. The process for converting olefinic hydrocarbons containing from three to four carbon atoms to the molecule to the corresponding alpha,beta-unsaturated carbonylic compounds consisting essentially of acrolein and methacrolein, respectively, which comprises contacting said olefinic hydrocarbons under conditions of controlled incomplete hydrocarbon oxidation in the temperature range of from about 150 to about 600° C. with a catalyst composition consisting essentially of particles of solid support material and an adherent pellicular deposit of copper metal formed upon said particles by the action of a reducing agent comprising hydrazine upon an ammoniacal solution of a reducible copper compound in the presence of said solid support material.

8. The process for the production of reaction products comprising acrolein from propylene which comprises contacting propylene under conditions of controlled incomplete olefin oxidation in the temperature range of from about 150 to about 600° C. with a catalyst composition consisting essentially of particles of solid support material and an adherent deposit of copper formed upon said particles by the action of a reducing agent comprising hydrazine upon an ammoniacal solution of a reducible copper acetate in the presence of said solid support material.

References Cited in the file of this patent

UNITED STATES PATENTS

| 1,919,730 | Koenig et al. | July 25, 1933 |
| 2,398,612 | Bergsteinsson et al. | Apr. 16, 1946 |

FOREIGN PATENTS

| 671,123 | Great Britain | Apr. 30, 1952 |
| 494,902 | Canada | July 28, 1953 |